United States Patent
Lee et al.

(10) Patent No.: US 11,108,521 B2
(45) Date of Patent: *Aug. 31, 2021

(54) METHOD FOR TRANSMITTING AND RECEIVING REFERENCE SIGNAL IN WIRELESS COMMUNICATION SYSTEM

(71) Applicant: Samsung Electronics Co., Ltd., Suwon-si (KR)

(72) Inventors: Keon-Kook Lee, Suwon-si (KR); Tae-Young Kim, Seongnam-si (KR); Ji-Yun Seol, Seongnam-si (KR); Su-Ryong Jeong, Yongin-si (KR); Jae-Seung Son, Suwon-si (KR); Byung-Moo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

This patent is subject to a terminal disclaimer.

(21) Appl. No.: 16/551,595

(22) Filed: Aug. 26, 2019

(65) Prior Publication Data

US 2019/0379496 A1  Dec. 12, 2019

Related U.S. Application Data

(63) Continuation of application No. 15/510,675, filed as application No. PCT/KR2015/009587 on Sep. 11, 2015, now Pat. No. 10,396,955.

(30) Foreign Application Priority Data

Sep. 11, 2014 (KR) .......................... 10-2014-0119958

(51) Int. Cl.
*H04L 5/00* (2006.01)
*H04L 25/02* (2006.01)
(Continued)

(52) U.S. Cl.
CPC .......... *H04L 5/005* (2013.01); *H04L 25/0204* (2013.01); *H04L 5/0073* (2013.01);
(Continued)

(58) Field of Classification Search
CPC ... H04L 5/005; H04L 5/0073; H04L 25/0204; H04L 25/0202–0258; H04L 2025/03796;
(Continued)

(56) References Cited

U.S. PATENT DOCUMENTS

| 8,139,474 B2 | 3/2012 | Nosley |
| 8,537,911 B2 | 9/2013 | Sayana et al. |

(Continued)

FOREIGN PATENT DOCUMENTS

| CN | WO2011/082655 | * | 7/2011 | ............ H04W 24/10 |
| CN | WO2011/120224 | * | 12/2011 | ............ H04L 27/26 |

(Continued)

OTHER PUBLICATIONS

International Search Report dated Jan. 22, 2016 in connection with International Application No. PCT/KR2015/009587, 22 pages.
(Continued)

*Primary Examiner* — Warner Wong

(57) ABSTRACT

The present disclosure relates to a 5G or pre-5G communication system to be provided for supporting a data rate higher than that of a 4G communication system, such as LTE, and subsequent communication systems. The present disclosure relates to a method for transmitting a reference signal (RS) in a wireless communication system, comprising the steps of: configuring a transmission resource by including at least one resource block (RB), which does not map the RS, between two RBs, which map the RS, in a first subframe; transmitting a first message for directing an RB offset indicating a gap between the two RBs, which map the RS,
(Continued)

and locations of the RBs, which map the RS; and transmitting the RS through the configured transmission resource.

20 Claims, 11 Drawing Sheets

(51) Int. Cl.
  *H04L 25/03* (2006.01)
  *H04L 27/26* (2006.01)
  *H04W 24/10* (2009.01)
(52) U.S. Cl.
  CPC .. *H04L 27/261* (2013.01); *H04L 2025/03783* (2013.01); *H04L 2025/03796* (2013.01); *H04W 24/10* (2013.01)
(58) Field of Classification Search
  CPC ........... H04L 2025/03783; H04L 27/00; H04L 27/261; H04L 15/0048–005; H04W 24/10; H04W 72/1263; H04W 28/0236; H04W 24/00–10
  See application file for complete search history.

(56) References Cited

U.S. PATENT DOCUMENTS

| | | | |
|---|---|---|---|
| 8,730,897 B2 | 5/2014 | Kim et al. | |
| 9,258,825 B2 | 2/2016 | Abe et al. | |
| 9,313,774 B2* | 4/2016 | Abe | H04W 72/04 |
| 9,374,719 B2 | 6/2016 | Xu et al. | |
| 9,780,901 B2 | 10/2017 | Cheng et al. | |
| 9,986,572 B2 | 5/2018 | Kim et al. | |
| 10,015,002 B2 | 7/2018 | Seo et al. | |
| 2006/0178148 A1 | 8/2006 | Du et al. | |
| 2006/0258382 A1 | 11/2006 | Zhang et al. | |
| 2010/0046459 A1 | 2/2010 | Nishio et al. | |
| 2010/0195748 A1 | 8/2010 | Nam et al. | |
| 2011/0051749 A1 | 3/2011 | Cheng et al. | |
| 2011/0082940 A1 | 4/2011 | Montemurro et al. | |
| 2011/0170631 A1 | 7/2011 | Kim et al. | |
| 2011/0176634 A1 | 7/2011 | Yoon et al. | |
| 2011/0188438 A1 | 8/2011 | Lee et al. | |
| 2011/0235743 A1* | 9/2011 | Lee | H04J 11/00 375/295 |
| 2011/0275396 A1 | 11/2011 | Nishio et al. | |
| 2011/0317581 A1 | 12/2011 | Hoshino et al. | |
| 2012/0058791 A1 | 3/2012 | Bhattad et al. | |
| 2012/0076106 A1* | 3/2012 | Bhattad | H04L 5/005 370/330 |
| 2012/0083283 A1 | 4/2012 | Phan et al. | |
| 2012/0106374 A1* | 5/2012 | Gaal | H04L 5/0048 370/252 |
| 2012/0108254 A1* | 5/2012 | Kwon | H04L 5/005 455/450 |
| 2012/0120842 A1* | 5/2012 | Kim | H04B 7/024 370/252 |
| 2012/0120891 A1* | 5/2012 | Mazzarese | H04W 72/042 370/329 |
| 2012/0120903 A1 | 5/2012 | Kim et al. | |
| 2012/0120910 A1* | 5/2012 | Mazzarese | H04L 5/0048 370/330 |
| 2012/0147829 A1 | 6/2012 | Zhang et al. | |
| 2012/0176885 A1 | 7/2012 | Lee et al. | |
| 2012/0207199 A1* | 8/2012 | Guo | H04L 1/0026 375/224 |
| 2012/0230271 A1* | 9/2012 | Kim | H04L 5/0062 370/329 |
| 2012/0282935 A1* | 11/2012 | Koivisto | H04L 1/0027 455/450 |
| 2012/0287875 A1 | 11/2012 | Kim et al. | |
| 2013/0044727 A1 | 2/2013 | Nory et al. | |
| 2013/0070719 A1* | 3/2013 | Xu | H04L 5/0057 370/329 |
| 2013/0088949 A1* | 4/2013 | Zhang | H04L 5/0007 370/208 |
| 2013/0089065 A1 | 4/2013 | Koorapaty et al. | |
| 2013/0128860 A1* | 5/2013 | Zhang | H04W 72/04 370/330 |
| 2013/0156015 A1* | 6/2013 | Abe | H04W 24/02 370/336 |
| 2013/0163544 A1 | 6/2013 | Lee et al. | |
| 2013/0194950 A1* | 8/2013 | Haghighat | H04L 5/0073 370/252 |
| 2013/0196675 A1 | 8/2013 | Xiao et al. | |
| 2013/0208678 A1* | 8/2013 | Zhang | H04L 5/0053 370/329 |
| 2013/0294277 A1* | 11/2013 | Nagata | H04B 17/382 370/252 |
| 2013/0301542 A1 | 11/2013 | Krishnamurthy et al. | |
| 2014/0022924 A1 | 1/2014 | Cili | |
| 2014/0029696 A1 | 1/2014 | Yoon et al. | |
| 2014/0036747 A1* | 2/2014 | Nory | H04W 74/0833 370/311 |
| 2014/0044088 A1 | 2/2014 | Nogami et al. | |
| 2014/0056265 A1* | 2/2014 | Koivisto | H04L 5/0025 370/329 |
| 2014/0079151 A1 | 3/2014 | Noh et al. | |
| 2014/0126517 A1 | 5/2014 | Choi et al. | |
| 2014/0169322 A1 | 6/2014 | Ouchi et al. | |
| 2014/0226551 A1 | 8/2014 | Ouchi et al. | |
| 2014/0269595 A1 | 9/2014 | Lee et al. | |
| 2014/0301340 A1 | 10/2014 | Benjebbour et al. | |
| 2015/0103932 A1 | 4/2015 | Yokote et al. | |
| 2015/0155993 A1 | 6/2015 | Berggren et al. | |
| 2015/0208397 A1* | 7/2015 | Lee | H04L 5/0048 370/329 |
| 2015/0280872 A1 | 10/2015 | Berggren et al. | |
| 2015/0318972 A1* | 11/2015 | Zhang | H04L 5/0057 370/329 |
| 2015/0372741 A1 | 12/2015 | Kim et al. | |
| 2016/0021641 A1 | 1/2016 | Nogami et al. | |
| 2016/0050153 A1* | 2/2016 | Xu | H04L 5/0023 370/230 |
| 2016/0242105 A1* | 8/2016 | Schier | H04L 5/0048 |

FOREIGN PATENT DOCUMENTS

| | | |
|---|---|---|
| KR | 10-2010-0017048 A | 2/2010 |
| KR | 10-2011-0022875 A | 3/2011 |
| KR | 10-2013-0075140 A | 7/2013 |
| KR | 10-2014-0098530 A | 8/2014 |
| WO | 2014021986 A1 | 2/2014 |
| WO | 2014107371 A1 | 7/2014 |

OTHER PUBLICATIONS

Written Opinion of the International Searching Authority dated Jan. 22, 2016 in connection with International Application No. PCT/KR2015/009587, 13 pages.
Sharp, "CSI Reference Resource for A-CSI Reporting for eIMTA", 3GPP TSG RAN WG1 Meeting #77, R1-142194, Seoul, Korea, May 19-23, 2014, 6 pages.
Office Action dated Nov. 25, 2020 in connection with Korean Patent Application No. 10-2014-0119958, 8 pages.
InterDigital Communications, LLC, "Interference Measurement in Rel-11", 3GPP TSG RAN WG1 Meeting #68bis, Mar. 26-30, 2012, R1-121311, 3 pages.

* cited by examiner

METHOD FOR TRANSMITTING AND RECEIVING REFERENCE SIGNAL IN WIRELESS COMMUNICATION SYSTEM

CROSS-REFERENCE TO RELATED APPLICATIONS

This application is a continuation of application Ser. No. 15/510,675, which is the National Stage of International Application No. PCT/KR2015/009587, filed Sep. 11, 2015, which claims priority to Korean Patent Application No. 10-2014-0119958, filed Sep. 11, 2014, the disclosures of which are herein incorporated by reference in their entirety.

BACKGROUND

1. Field

The present disclosure relates to a method for transmitting a reference signal (RS) in a wireless communication system, and more particularly, to a method for reducing overhead during RS transmission and reception.

2. Description of Related Art

To satisfy the growing demands for wireless data traffic since commercialization of a $4^{th}$ generation (4G) communication system, efforts have been made to develop an improved $5^{th}$ generation (5G) or pre-5G communication system. That is why the 5G or pre-5G communication system is called a beyond 4G network communication system or a post long term evolution (post LTE) system.

To achieve high data rates, deployment of the 5G communication system in a millimeter wave (mmWave) band (for example, 60 GHz) is under consideration. In order to mitigate propagation path loss and increase a propagation distance in the mmWave band, beamforming, massive multiple input multiple output (massive MIMO), full dimensional MIMO (FD-MIMO), array antenna, analog beamforming, and large-scale antenna technologies have been discussed for the 5G communication system.

Further, to improve a system network, techniques such as evolved small cell, advanced small cell, cloud radio access network (cloud RAN), ultra-dense network, device-to-device (D2D) communication, wireless backhaul, moving network, cooperative communication, coordinated multi-point (CoMP), and interference cancelation have been developed for the 5G communication system.

Besides, advanced coding modulation (ACM) techniques such as hybrid FSK and QAM modulation (FQAM) and sliding window superposition coding (SWSC), and advanced access techniques such as filter bank multi carrier (FBMC) and non-orthogonal multiple access (NOMA), and sparse code multiple access (SCMA) have been developed for the 5G communication system.

To increase the system capacity of a wireless communication system, techniques for increasing the number of antennas in a base station (BS) have been developed. A multi-antenna system may increase system capacity significantly by facilitating multi-user MIMO (MU MIMO) transmission through an array gain of antennas.

For implementation of a multi-antenna system, a transmitter (for example, a BS) needs channel information about a receiver (for example, a user equipment (UE)) to which the transmitter is to transmit a signal. In a frequency division dulplex (FDD) wireless network, the receiver estimates channel information and then feeds back the estimated channel information to the transmitter in order to provide channel information needed for the transmitter. Specifically, the receiver estimates channel information using a reference signal (RS) received on a downlink, quantizes the estimated channel information, and feeds back the quantized channel information to the transmitter.

In a long term evolution-advanced (LTE-A) system, the receiver uses channel state information RSs (CSI-RSs) for channel estimation. The CSI-RSs are designed to use resources orthogonal between antennas, for accurate channel estimation. Due to the orthogonal feature of the CSI-RSs, more antennas are available in the LTE-A system. However, more resources are also used for CSI-RS transmission in proportion to an increase in the number of antennas.

SUMMARY

If a transmitter maps CSI-RSs for all antenna ports to each resource block (RB) for estimation of channel information about a receiver in a wireless communication system, the accuracy of channel measurement increases. However, the receiver should feed back channel information about all of the antenna ports to the transmitter, and the transmitter should allocate resources for all of the antenna ports. The resulting increase of overhead reduces resources to be used for data transmission. According to $3^{rd}$ generation partnership project (3GPP) Release 12, if interference between CSI-RSs is ignored, up to 40 resources, that is, 40 resource elements (REs) are available for CSI-RSs in one RB. The maximum 40 resources may be used for CSI-RS transmission, up to 8 resources per BS, and also for controlling CSI-RS interference between adjacent BSs. However, if the number of CSI-RSs to be used in a BS is increased, this resource use method needs to be modified. That is, if a system is designed so that the maximum number of CSI-RSs to be used per BS may be increased, 40 resources as provided in the current specification (that is, 3GPP Release 12) may not be sufficient, considering control of interference between adjacent BSs.

An aspect of the present disclosure is to provide a method for increasing the number of RSs transmitted in radio resources by a base station (BS) in a wireless communication system.

Another aspect of the present disclosure is to provide a method for saving resources used in CSI-RS transmission, while minimizing the degradation of channel estimation performance in a wireless communication system.

Another aspect of the present disclosure is to provide a method for enabling transmission of more RSs, while minimizing the overhead of RS transmission in a wireless communication system.

In an aspect of the present disclosure, a method for transmitting a reference signal (RS) in a wireless communication system includes configuring transmission resources by including at least one resource block (RB) to which an RS is not mapped between two RBs to which RSs are mapped in a first subframe, transmitting a first message indicating a spacing between the two RBs to which RSs are mapped, and an RB offset indicating positions of the RBs to which RSs are mapped, and transmitting the RSs in the configured transmission resources.

In another aspect of the present disclosure, a method for transmitting an RS in a wireless communication system includes configuring transmission resources by mapping at least two different RS subsets of an RS set, respectively to at least two contiguous RBs in a first subframe, transmitting a first message indicating a maximum number of antenna ports used for transmission of RSs, and transmitting the RSs in the configured transmission resources.

In another aspect of the present disclosure, an apparatus for transmitting an RS in a wireless communication system includes a controller for controlling configuration of transmission resources by including at least one RB to which an RS is not mapped between two RBs to which RSs are mapped in a first subframe, transmission of a first message indicating a spacing between the two RBs to which RSs are mapped, and an RB offset indicating positions of the RBs to which RSs are mapped, and transmission of the RSs in the configured transmission resources, and a transceiver for transmitting the first message and the RSs under control of the controller.

In another aspect of the present disclosure, an apparatus for transmitting an RS in a wireless communication system includes a controller for controlling configuration of transmission resources by mapping at least two different RS subsets of an RS set, respectively to at least two contiguous RBs in a first subframe, transmission of a first message indicating a maximum number of antenna ports used for transmission of RSs, and transmission of the RSs in the configured transmission resources, and a transceiver for transmitting the first message and the RSs under control of the controller.

In another aspect of the present disclosure, a method for transmitting a channel state information interference measurement (CSI-IM) in a wireless communication system includes configuring transmission resources by including at least one RB to which a CSI-IM is not mapped between two RBs to which CSI-IMs are mapped in a first subframe, transmitting a first message indicating a spacing between the two RBs to which CSI-IMs are mapped, and an RB offset indicating positions of the RBs to which CSI-IMs are mapped, and transmitting the CSI-IMs in the configured transmission resources.

In another aspect of the present disclosure, a method for transmitting a CSI-IM in a wireless communication system includes configuring transmission resources by mapping at least two different CSI-IM subsets of a CSI-IM set, respectively to at least two contiguous RBs in a first subframe, transmitting a first message indicating a maximum number of antenna ports used for transmission of CSI-IMs, and transmitting the CSI-IMs in the configured transmission resources.

In another aspect of the present disclosure, a method for feeding back a channel estimation result using an RS in a wireless communication system includes receiving a first message indicating a spacing between two RBs to which RSs are mapped, and an RB offset indicating the positions of the RBs to which RSs are mapped, receiving the RSs using the spacing and the RB offset indicated by the first message, performing channel estimation using the received RSs, and feeding back a result of the channel estimation.

In another aspect of the present disclosure, a method for feeding back a channel estimation result using an RS in a wireless communication system includes receiving a first message including information about a maximum number of antenna ports used for RS transmission, receiving RSs using the maximum number of antenna ports indicated by the first message, performing channel estimation using the received RSs, and feeding back a result of the channel estimation. The RSs are received in transmission resources configured by mapping at least two different RS subsets of a set of the RSs respectively to at least two contiguous RBs in a first subframe.

In another aspect of the present disclosure, an apparatus for feeding back a channel estimation result using an RS in a wireless communication system includes a controller for controlling reception of a first message indicating a spacing between two RBs to which RSs are mapped, and an RB offset indicating the positions of the RBs to which RSs are mapped, reception of the RSs using the spacing and the RB offset indicated by the first message, channel estimation using the received RSs, and feedback of a result of the channel estimation, and a transceiver for receiving the first message and the RSs, and performing the feedback, under control of the controller.

In another aspect of the present disclosure, an apparatus for feeding back a channel estimation result using an RS in a wireless communication system includes a controller for controlling reception of a first message including information about a maximum number of antenna ports used for RS transmission, reception of RSs using the maximum number of antenna ports indicated by the first message, channel estimation using the received RSs, and feedback of a result of the channel estimation, and a transceiver for receiving the first message and the RSs, and performing the feedback, under control of the controller. The RSs are received in transmission resources configured by mapping at least two different RS subsets of a set of the RSs respectively to at least two contiguous RBs in a first subframe.

According to an embodiment of the present disclosure, the system overhead of channel state information reference signal (CSI-RS) transmission may be reduced.

According to an embodiment of the present disclosure, more than 8 CSI-RSs per base station (BS) may be supported simply by making a minimal modification to a communication scheme conforming to $3^{rd}$ generation partnership project (3GPP) Release 12.

According to an embodiment of the present disclosure, the accuracy of channel measurement may be increased by changing a resource block (RB) offset, and frequency selectivity may be measured indirectly based on feedback information.

According to an embodiment of the present disclosure, CSI-RS mapping may be more flexible than in a legacy method.

DETAILED DESCRIPTION

A representative embodiment for achieving the above technical objects will be presented in a detailed description of the present disclosure. A detailed description of a generally known function or structure of the present disclosure will be avoided lest it should obscure the subject matter of the present disclosure. Although the terms used in the present disclosure are defined in consideration of functions in the embodiments of the present disclosure, the terms may be changed according to the intention of a user or an operator, or customs. Therefore, the present disclosure should be understood, not simply by the actual terms used but by the meanings of each term lying within.

Instead of the term 'antenna', 'antenna port' will often be used hereinbelow. This implies that an antenna port is not necessarily a physical antenna in the long term evolution (LTE) wireless access standards. In fact, an antenna port is defined by the existence of a reference signal (RS) specific to the antenna port. Therefore, if the same RS is transmitted through a plurality of physical antennas, a receiver does not distinguish them from each other, considering the physical antennas to be one antenna port. In the present disclosure, the term 'channel state information reference signal (CSI-RS) antenna port' may also be interchangeably used.

In the present disclosure, a transmitter is an apparatus for transmitting an RS such as CSI-RS. For example, a transmitter may refer to an apparatus such as a base station (BS) in a cellular communication system.

In the present disclosure, a receiver is an apparatus for receiving an RS such as CSI-RS. For example, a receiver may refer to an apparatus such as a user equipment (UE) in a cellular communication system.

Further, 'CSI-RSs are mapped to a resource block (RB)' means specifying resource elements (REs) of the RB to be used for the CSI-RSs in the present disclosure.

Figures 1A, 1B, 1C:
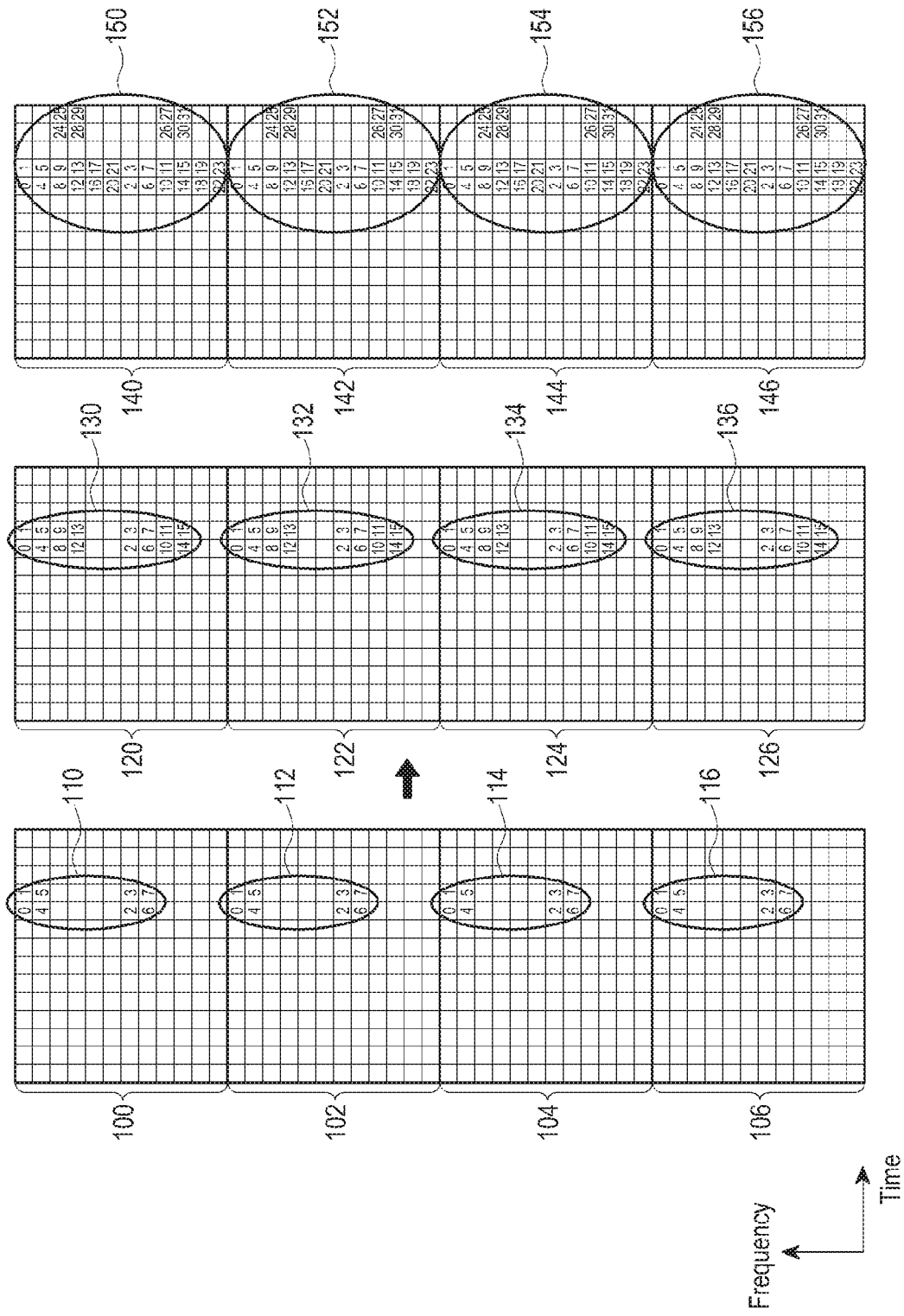
FIGS. 1A-1C illustrate a method for supporting transmission of a plurality of channel state information reference signals (CSI-RSs) in a legacy CSI-RS transmission method.

FIGS. 1A-1C illustrate a method for supporting transmission of more CSI-RSs than defined in a current specification according to an embodiment of the present disclosure.

FIG. 1A is a view illustrating exemplary mapping of a maximum supported number of CSI-RSs for one antenna port to an RB according to the current specification (that is, $3^{rd}$ generation partnership project (3GPP) Release 12).

According to 3GPP Release 12, one antenna port may be mapped to up to 8 REs in one RB. For example, FIG. 1A is based on the assumption that four RBs 100, 102, 104, and 106 are transmitted in one subframe. A transmitter maps eight CSI-RSs 110, 112, 114, and 116 to each of the four RBs 100, 102, 104, and 106 and transmits the CSI-RSs 110, 112, 114, and 116 to a receiver. A requirement for CSI-RSs is that the CSI-RSs are transmitted only in specific orthogonal frequency division multiplex (OFDM) symbols to facilitate transmission power control. If all CSI-RSs are mapped to each RB, the accuracy of channel estimation may be increased. However, if the number of CSI-RSs is also increased due to an increase in the number of antenna ports, mapping of all CSI-RSs to each RB may increase system overhead.

A method for transmitting CSI-RSs for more antenna ports using a current CSI-RS transmission method is to modify a resource configuration that limits the number of CSI-RSs to 8. Specifically, FIG. 1B illustrates a method for transmitting 16 CSI-RSs 130, 132, 134, and 136 extended from 8 CSI-RSs, and FIG. 1C illustrates a method for transmitting 32 CSI-RSs 150, 152, 154, and 156 extended from 8 CSI-RSs.

Since CSI-RS is an RS used for channel measurement, system operation is possible without transmitting CSI-RSs in every subframe. In 3GPP Release 12, a subframe and the positions of REs which carry CSI-RSs may be set by setting a subframe configuration and a resource configuration. For operation of a UE, a BS should indicate a CSI-RS port number, a subframe configuration, and a resource configuration to the UE.

A resource configuration for CSI-RS mapping configures a maximum of 40 resources for CSI-RSs. The reason for configuring more than 8 resources is to enable a neighbor BS to also transmit CSI-RSs in orthogonal resources.

To render CSI-RS reception to be reliable between adjacent cells, each BS may not transmit data in overlapped RS resources. For this purpose, a resource configuration and a subframe configuration which are related to zero powered CSI-RSs (ZP-CSI-RSs) may be indicated. ZP-CSI-RS information may be interpreted in correspondence with one RB, and the UE may perform data demodulation by applying the interpreted ZP-CSI-RS information to all RBs.

Now, a detailed description will be given of various embodiments of the present disclosure with reference to the attached drawings.

Figure 2:
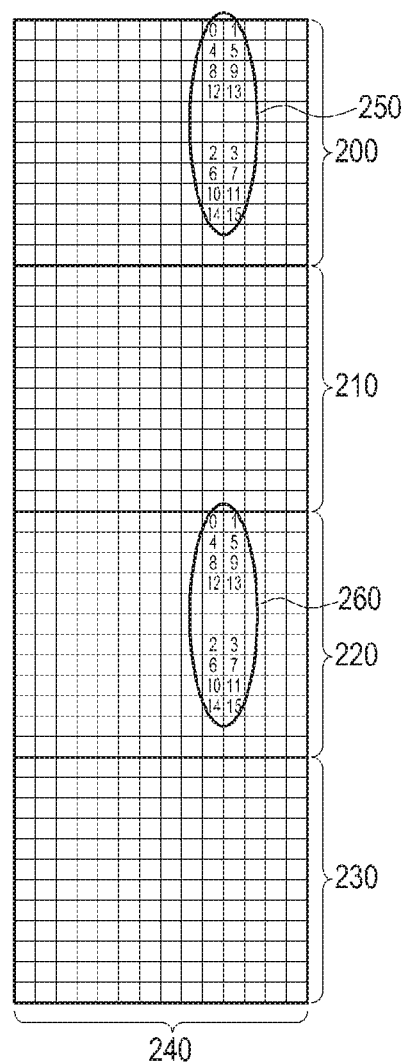
FIG. 2 illustrates a method for mapping CSI-RSs with a spacing between resource blocks (RBs) according to an embodiment of the present disclosure.

FIG. 2 illustrates a method for mapping CSI-RSs with a spacing between RBs according to an embodiment of the present disclosure.

In the embodiment, an 'RB spacing' is an interval between RBs to which CSI-RSs are mapped. Therefore, an RB spacing is calculated by adding 1 to the number of RBs without CSI-RSs between RBs with CSI-RSs mapped. For example, if one RB without CSI-RSs is interposed between CSI-RS-mapped RBs, the RB spacing is 2. If there is no RB without CSI-RSs between CSI-RS-mapped RBs (that is, if a legacy CSI-RS mapping method is used), the RB spacing is 1. In another example, if CSI-RSs are mapped to RB 0, no CSI-RSs are mapped to RB 1, RB 2, RB 3, and RB 4, and CSI-RSs are mapped to RB 5, the RB spacing may be 5.

Therefore, CSI-RSs are mapped to only one of as many contiguous RBs as an RB spacing in the embodiment. An 'RB offset' refers to the position of an RB to which CSI-RSs are mapped. If CSI-RSs are mapped to the first of as many contiguous RBs as an RB spacing, the RB offset is 0. In FIG. 2, since CSI-RSs are mapped in the first RB counted from the top (along the frequency axis), the RB offset is 0. In another example, if CSI-RSs are mapped to the third RB and then the eighth RB, the RB spacing is 5 and the RB offset is 2.

FIG. 2 illustrates an example based on the assumption that four RBs 200, 210, 220, and 230 are transmitted in one subframe 240. Although CSI-RSs 250 and 260 are mapped to the first and third RBs 200 and 220, no CSI-RSs are mapped to the second and fourth RBs 210 and 230. That is, CSI-RSs are mapped with an RB spacing of 2 and an RB offset of 0 in the example of FIG. 2.

Compared to the legacy method, the above proposed embodiment may reduce the overhead of CSI-RS transmission by setting an RB spacing. A transmitter may change an RB spacing and an RB offset over time, for system optimization. The RB spacing and the RB offset may be signaled independently (that is, as separate information) or as a single combined value.

[Table 1] illustrates an example of combining an RB spacing and an RB offset into a single value (that is, $D_{CSI-RS}$).

TABLE 1

| RB spacing and RB offset in combination (CSI-RS-RBSpacingConfig) ($D_{CSI-RS}$) | RB spacing ($F_{CSI-RS}$, RBs) | RB offset (CSI-RS RB offset) ($\Delta_{F,CSI-RS}$) |
|---|---|---|
| 0 | 1 | — |
| 1-2 | 2 | $D_{CSI-RS}$-1 |
| 3-5 | 3 | $D_{CSI-RS}$-3 |
| 6-9 | 4 | $D_{CSI-RS}$-6 |
| 10-14 | 5 | $D_{CSI-RS}$-10 |
| 15-20 | 6 | $D_{CSI-RS}$-15 |

In the example of FIG. 2, the RB spacing is 2 and the RB offset is 0. Therefore, the result of combining the RB spacing and the RB offset, $D_{CSI-RS}$ is 1 because $D_{CSI-RS}-1=0$. In another example, if the RB spacing is 4 and the RB offset is 2, the result $D_{CSI-RS}$ of combining the RB spacing and the RB offset. $D_{CSI-RS}$ is 8 because $D_{CSI-RS}-6=2$.

[Table 2] illustrates an exemplary structure of a message in which the transmitter transmits CSI-RS information to the receiver according to an embodiment using an RB spacing.

TABLE 2

```
CSI-RS-Config   ::= SEQUENCE {
   csi-RS          CHOICE {
      release         NULL,
      setup           SEQUENCE {
         antennaPortsCount  ENUMERATED {an1, an2, an4, an8, an16,
                                       an32},
         resourceConfig     INTEGER (0. .31),
         subframeConfig     INTEGER (0. .154),
         D-CSI-RS           INTEGER (0. .20),
      }
   }
}
```

According to the message of [Table 2], the transmitter may add an16 and an32 as values available as antennaPortsCount in order to support 16 antenna ports and 32 antenna ports. Further, D-CSI-RS indicating the result $D_{CSI-RS}$ of combining an RB spacing and an RB offset may be added.

The transmitter may transmit no signal in specific resource elements (REs) to reduce CSI-RS interference with a neighbor cell. The transmitter may transmit information indicating the absence of any signal in the REs as a ZP-CSI-RS value to the receiver.

Conventionally, the same CSI-RSs are mapped to each RB, and thus the transmitter transmits ZP-CSI-RSs of a 16-bit bitmap generated based on one RB. On the other hand, if the embodiment using an RB spacing is applied, the ZP-CSI-RS transmission rule should be changed in case a neighbor transmitter may use a different RB spacing from that of the transmitter.

For example, it is assumed that transmitter #1 transmits CSI-RSs with an RB spacing of 1, transmitter #2 transmits CSI-RSs with an RB spacing of 2, and transmitter #3 transmits CSI-RSs with an RB spacing of 3. Because adjacent transmitters use different CSI-RS resource use patterns, they may have different RB spacings, and thus transmit CSI-RSs at different positions according to the RB spacings.

A transmitter needs to apply ZP-CSI-RSs only to CSI-RS resources in which a neighbor transmitter transmits CSI-RSs. In the above example, transmitter #1 and transmitter #2 may transmit, to receivers, ZP-CSI-RS information with an RB spacing of 3 as well as ZP-CSI-RS information with an RB spacing of 1 and ZP-CSI-RS information with an RB spacing of 2 not to interfere with CSI-RS transmission of transmitter #3. As a consequence, resources may be used more efficiently.

That is, the receiver connected to transmitter #1 receives as many pieces of ZP-CSI-RS information as the RB spacing of transmitter #3 being a transmitter having a largest RB spacing among the neighbor transmitters. In the example, the receiver receives three pieces of ZP-CSI-RS information which are applied with an RB spacing of 3.

Therefore, the embodiment proposes that a transmitter transmits, to a receiver connected to the transmitter, a plurality of pieces of ZP-CSI-RS information including ZP-CSI-RS information for an RB spacing applied to the transmitter.

[Table 3] illustrates an exemplary structure of a message in which the transmitter transmits ZP-CSI-RS information to the receiver according to an embodiment using an RB spacing.

TABLE 3

```
CSI-RS-ConfigZP    ::=  SEQUENCE {
   csi-RS-ConfigZPId       CSI-RS-ConfigZPId,
   resourceConfigList      BIT STRING (SIZE (16)),
   subframeConfig          INTEGER (0. .154),
   ...
}
csi-RS-ConfigZPId  ::=  INTEGER (1. .maxRBSpacing)
```

Although a legacy ZP-CSI-RS bitmap may still be used, an independent ZP-CSI-RS bitmap (resourceConfigList) is required for each RB spacing. csi-RS-ConfigZPID may be added to the message in order to reflect an independent ZP-CSI-RS bitmap for each RB spacing. The ZP-CSI-RS bitmap is information indicating a resource configuration for resources mapped to ZP-CSI-RSs.

Hereinbelow, embodiments of changing an RB spacing and an RB offset over time for system optimization will be described.

Figures 3A, 3B:
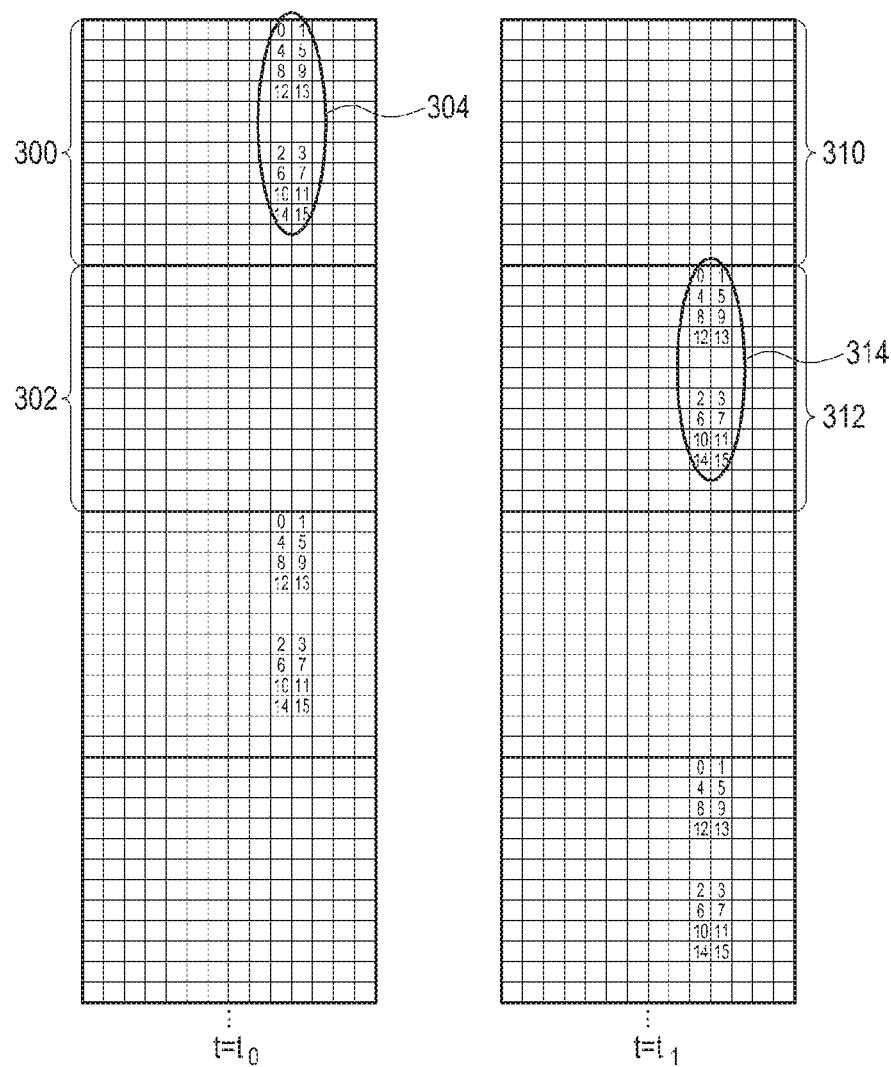
FIGS. 3A-3B illustrate change of CSI-RS transmission positions over time according to an embodiment of the present disclosure.

FIGS. 3A-3B illustrate change of CSR-RS transmission positions over time according to an embodiment of the present disclosure.

FIG. 3A illustrates a part of RBs in a subframe that a transmitter transmits to a receiver at time $t_0$ ($t=t_0$). The RB spacing is 2 and the RB offset is 0 at time $t_0$. In other words, CSI-RSs 304 are mapped to RB 0 300 among as many contiguous RBs 300 and 302 as the RB spacing.

FIG. 3B illustrates a part of RBs in a subframe that the transmitter transmits to the receiver at time $t_1$ ($t=t_1$). The RB spacing is 2 and the RB offset is 1 at time $t_1$. In other words, CSI-RSs 304 are mapped to RB 1 312 among as many contiguous RBs 310 and 312 as the RB spacing.

FIGS. 3A-3B illustrate a case in which the transmitter changes an RB offset over time, for system optimization. While FIGS. 3A-3B illustrate an embodiment of changing an RB offset, the transmitter may change an RB spacing over time. According to the embodiment, the accuracy of channel measurement may be increased by changing an RB offset, and the channel state of a user may be measured indirectly based on changed channel information.

Figures 4A, 4B:
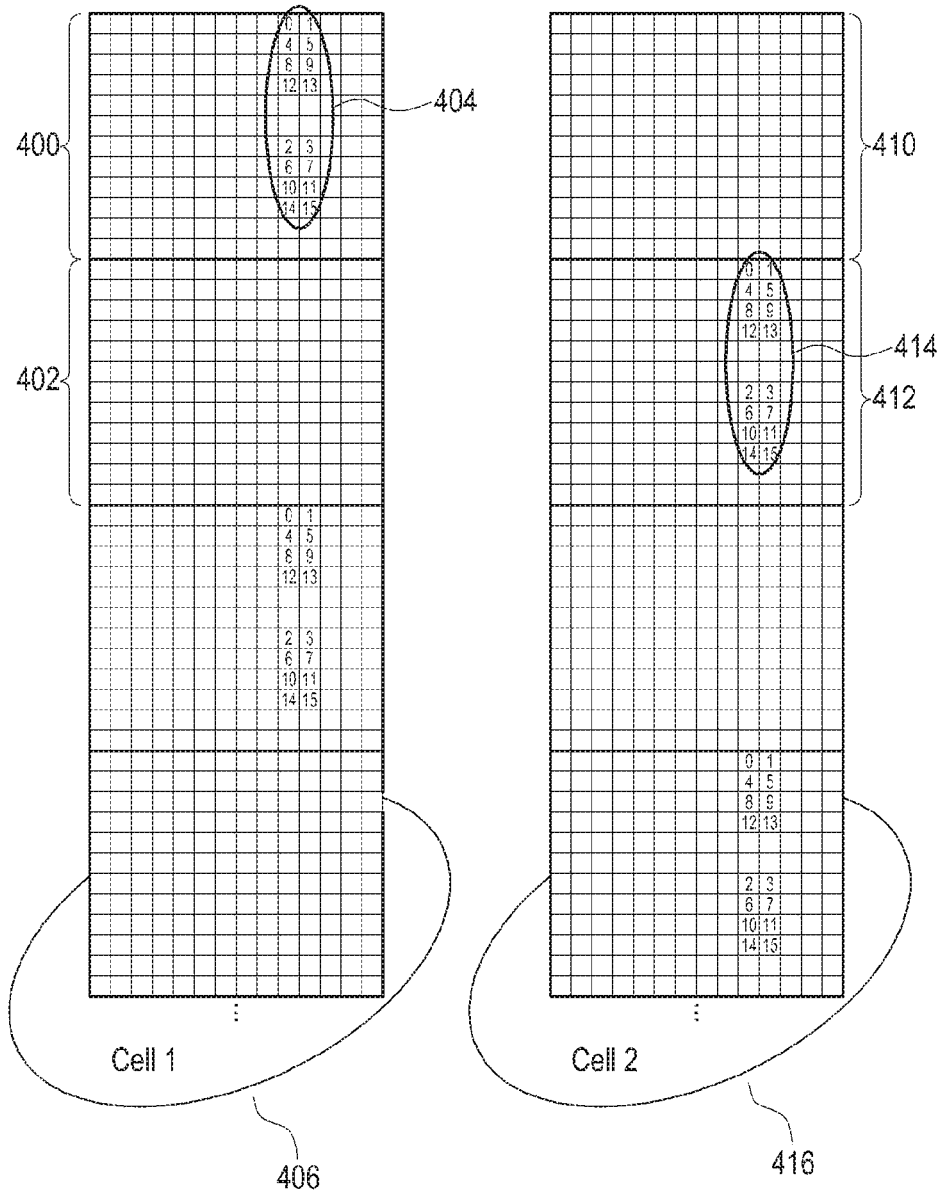
FIGS. 4A-4B illustrates adjustment of CSI-RS interference between adjacent cells using the foregoing embodiment according to an embodiment of the present disclosure.

FIGS. 4A-4B illustrate adjustment of CSI-RS interference between adjacent cells by applying an embodiment using an RB spacing according to an embodiment of the present disclosure.

FIG. 4A illustrates a part of RBs that a transmitter transmits to a receiver in cell 1 406, and FIG. 4B illustrates a part of RBs that a transmitter transmits to a receiver in cell 2 416 neighboring to cell 1 406.

Cell 1 406 maps CSI-RSs to RBs with an RB spacing of 2 and an RB offset of 0. That is, CSI-RSs 404 are mapped to RB 0 400 among as many contiguous RBs 400 and 402 as the RB spacing.

Cell 2 416 maps CSI-RSs to RBs with an RB spacing of 2 (equal to the RB spacing of cell 1 406) and an RB offset of 1 different from that of cell 1 406 in order to maintain orthogonality with the CSI-RSs of cell 1 406. That is, CSI-RSs 414 are mapped to RB 1 410 among as many contiguous RBs 410 and 412 as the RB spacing.

The foregoing embodiment may offer more flexibility to CSI-RS mapping than the legacy method, and require application of the same overhead between transmission points (for example, BSs or radio remote heads (RRHs)) in a coordinated multi-point (CoMP) set.

Figure 5:
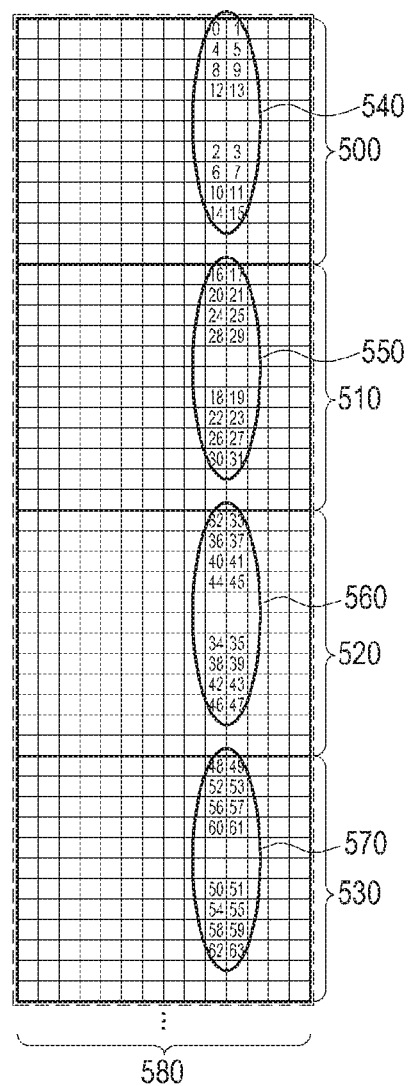
FIG. 5 illustrates a method for mapping CSI-RSs to a bundle of adjacent RBs according to an embodiment of the present disclosure.

FIG. 5 illustrates a method for mapping CSI-RSs to a bundle of adjacent RBs according to an embodiment of the present disclosure.

On the assumption that a BS has 64 antenna ports and should also transmit 64 CSI-RSs, mapping of all of the 64 CSI-RSs to every RB increases system overhead. Therefore, the embodiment proposes a method for mapping CSI-RSs across a plurality of adjacent RBs by bundling the RBs. In the embodiment, the BS maps CSI-RSs distributedly to a plurality of RBs, instead of mapping all of the CSI-RSs to one RB. That is, the BS maps different subsets of CSI-RSs 540, 550, 560, and 570 respectively to a plurality of RBs 500, 510, 520, and 530 that form an RB bundle. In the present disclosure, an RB bundle is a group of contiguous RBs across which a CSI-RS set is mapped, or a group of contiguous RBs to which different CSI-RS subsets are mapped. An 'RB bundle size' or an 'RB bundle spacing' is the number of RBs grouped into one bundle.

In FIG. 5, the total number of CSI-RSs is 64, the RB bundle size is 4, and the number of CSI-RSs mapped to each RB is 16 (=64/4).

The transmitter may control at least one of an RB bundle size and the number of CSI-RSs to be mapped per RB, for system optimization. Therefore, the transmitter should explicitly indicate to the receiver at least one of the RB bundle size and the number of CSI-RSs to be mapped per RB. Optionally, the transmitter may indicate the positions of mapped CSI-RSs to the receiver.

[Table 4] illustrates an exemplary structure of a message in which the transmitter transmits CSI-RS information to the receiver according to an embodiment using an RB bundle.

TABLE 4

```
CSI-RS-Config  ::=  SEQUENCE {
    csi-RS         CHOICE {
        release        NULL,
        setup          SEQUENCE {
            antennaPortsCount    ENUMERATED {an1, an2, an4, an8,
                                             an16, an32, an64},
            resourceConfig       INTEGER (0..31),
            subframeConfig       INTEGER (0..154),
            RBBundingConfig      INTEGER (1, 2, 3, 6),
```

TABLE 4-continued

```
            antennaPortCountPerRB    ENUMERATED {an1, an2, an4, an8}
}
```

According to the message, the transmitter supports 16, 32, and 64 antenna ports. Thus, an16, an32, and an64 may be added as values available as antennaPortsCount. Further, RBBundlingConfig representing an RB bundle size and antennaPortCountPerRB representing the number of antenna ports (that is, the number of CSI-RSs) to be mapped per RB may be added. According to the message, 1, 2, 3, and 6 may be supported as the RB bundle size, and 1, 2, 4, and 8 may be supported as the number of antenna ports to be mapped per RB.

In the embodiment, the transmitter transmits a bitmap for a ZP-CSI-RS resource configuration on an RB bundle basis as a method for transmitting ZP-CSI-RSs which are information indicating no signal in an RE.

[Table 5] illustrates an exemplary structure of a message in which the transmitter transmits ZP-CSI-RS information to the receiver according to an embodiment using an RB bundle.

TABLE 5

```
CSI-RS-ConfigZP ::= SEQUENCE {
    csi-RS-ConfigZPId    CSI-RS-ConfigZPId,
    RBBundleConfig       INTEGER (1, 2, 3, 6),
    resourceConfigList   BIT STRING (SIZE (16)*RBBundleConfig),
    subframeConfig       INTEGER (0..154),
    ...
}
```

RBBundleConfig representing an RB bundle size and resourceConfigList representing a ZP-CSI-RS bitmap may be added to the message. According to the embodiment, the ZP-CSI-RS bitmap may have a size of the product between the RB bundle size and the legacy size of one RB (16 bits).

In the embodiments using an RB spacing and the embodiments using an RB bundle, the following may be additionally considered in determining an RB spacing and an RB bundle size.

If a transmitter (for example, a BS) transmits CSI-RSs in RBs to a receiver (for example, a UE), upon receipt of the CSI-RSs, the receiver may perform a procedure of estimating a channel, generating information about the estimated channel, and feeding back the information to the transmitter. Two methods for generating estimated channel information and transmitting the channel information to a transmitter may be available. One of the methods is wideband feedback in which channel information about total RBs is generated as a singe piece of information during generation of the estimated channel information, and the other method is subband feedback in which total RBs are divided into a plurality of subbands and channel information is generated and transmitted for each subband.

In a system using subband feedback, when feeding back channel information about a subband to a transmitter, a receiver may select one of the factors of the number of RBs per subband (hereinafter, referred to as a 'subband size') as an RB bundle size or an RB spacing. For example, an LTE system using a frequency bandwidth of 10 MHz may configure the total frequency bandwidth with 50 RBs. According to [Table 6], if subband feedback is used in the LTE system, the subband size is 6 RBs. Therefore, according to the embodiment, the system may have the constraint that the RB bundle size or the RB spacing is one of the factors of 6, that is, 1, 2, 3, or 6. Along with a change in the frequency bandwidth of the system, a subband size (that is, the number of RBs per subband), an RB bundle size, and an RB spacing may be changed, and thus the constraint may also be changed.

TABLE 6

| Number of RBs for system bandwidth ($NL_{RB}^{DL}$) | Subband size (k) |
|---|---|
| 6-7 | NA |
| 8-10 | 4 |
| 11-26 | 4 |
| 27-63 | 6 |
| 64-110 | 8 |

Figure 6:
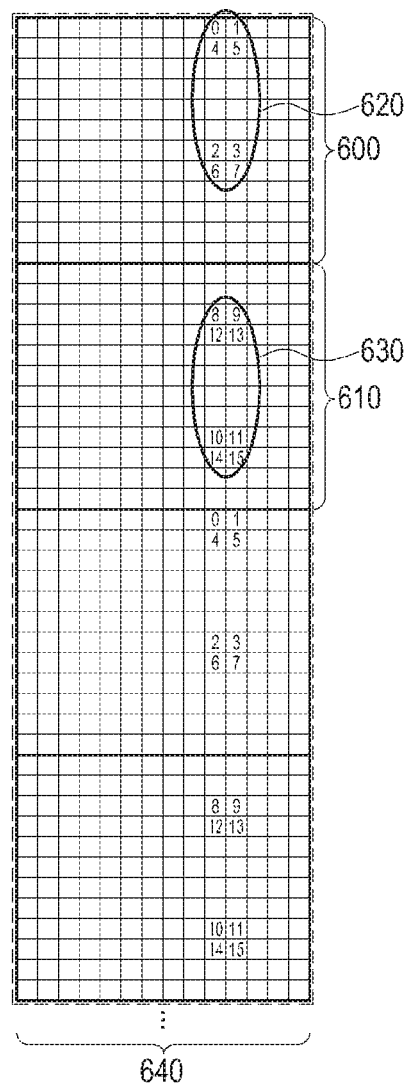
FIG. 6 illustrates a method for mapping a fixed number of CSI-RSs to each RB according to an embodiment of the present disclosure.

FIG. 6 illustrates a method for mapping a fixed number of CSI-RSs to one RB according to an embodiment of the present disclosure.

In FIG. 6, on the assumption that 8 CSI-RSs are available for transmission in one RB according to the current specification and 16 CSI-RSs are to be transmitted, the CSI-RSs are mapped to RBs. That is, since 8 CSI-RSs can be mapped to one RB, two RBs 600 and 610 are needed to map 16 CSI-RBs 620 and 630.

While the embodiment is similar to the embodiment disclosed in FIG. 5, the number of CSI-RSs to be mapped to one RB is fixed in system design and thus there is no need for signaling the number of CSI-RSs to be mapped per RB to the receiver.

[Table 7] illustrates an exemplary structure of a message in which the transmitter transmits CSI-RS information to the receiver in an embodiment in which an RB bundle is used and a fixed number of CSI-RSs are mapped to one RB.

TABLE 7

```
CSI-RS-Config ::=  SEQUENCE {
    csi-RS              CHOICE {
        release             NULL,
        setup               SEQUENCE {
            antennaPortsCount   ENUMERATED {an1, an2, an4, an8, an16,
                                            an32, an64},
            resourceConfig      INTEGER (0..31),
            subframeConfig      INTEGER (0..154),
            p-C-r10             INTEGER (-8..15)
        }
    }
}
```

In the system according to the embodiment, the number of CSI-RSs to be transmitted in one RB by the transmitter is predetermined. The transmitter may indicate the total number of CSI-RSs to be transmitted, antennaPortsCount, and the receiver may determine the number of RBs needed to receive the total CSI-RSs by dividing the total number of CSI-RSs by the number of CSI-RSs mapped to one RB. According to the message, the transmitter supports 16, 32, and 64 antenna ports, and thus may add an16, an32, and an64 as values available as antennaPortsCount.

In the embodiment, since a predetermined number of CSI-RSs are mapped to all RBs, a new information element is not included in a message in which the transmitter transmits ZP-CSI-RS information to the receiver. That is, the ZP-CSI-RS information may be represented only by a ZP-CSI-RS identifier (ID), a resource configuration, and a subframe configuration.

Figure 7:
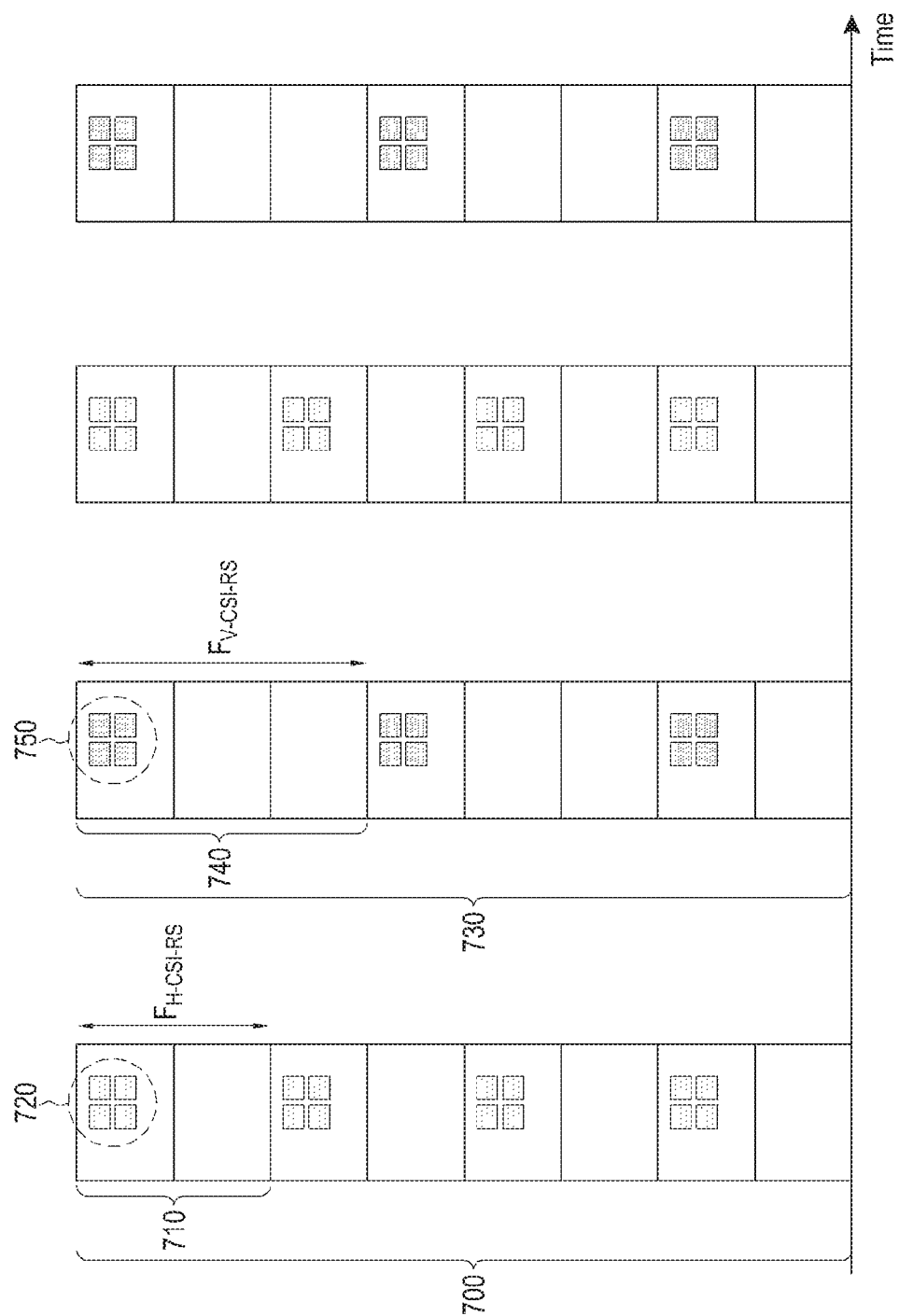
FIG. 7 illustrates a method for applying different CSI-RS mappings to different subframes using a plurality of CSI processors according to an embodiment of the present disclosure.

FIG. 7 illustrates a method for applying different CSI-RS mappings to different subframes using a plurality of CSI processors according to an embodiment of the present disclosure.

For example, a first CSI processor processes a horizontal antenna, and an RB 700 is one of RBs processed by the first CSI processor. The first CSI processor may map CSI-RSs to RBs with an RB spacing of 2, $F_{H-CSI-RS}$ 710 and an RB offset of 0 720. A second CSI processor processes a vertical antenna, and an RB 730 is one of RBs processed by the second CSI processor. The second CSI processor may map CSI-RSs to RBs with an RB spacing of 3, $F_{V-CSI-RS}$ 740 and an RB offset of 0 750. While FIG. 7 illustrates application of different RB mapping schemes to different subframes, it is also possible to apply two or more RB mapping schemes to one subframe.

The embodiment may be used as a method for applying the legacy mapping method and a plurality of embodiments of the present disclosure at the same time. Specifically, the first CSI processor may use a mapping method that does not use an RB spacing or an RB bundle, and the second CSI processor may use one of the mapping methods according to the embodiments of the present disclosure.

While the first and second CSI processors use only different RB spacings in the mapping method of the embodiment, a mapping method for using different RB spacings (RB offsets) and RB bundle sizes according to precoding utilization may be used. Further, some CSI processors may use a mapping method with an RB spacing and an RB offset, and other CSI processors may use a mapping method with an RB bundle.

Figure 8:
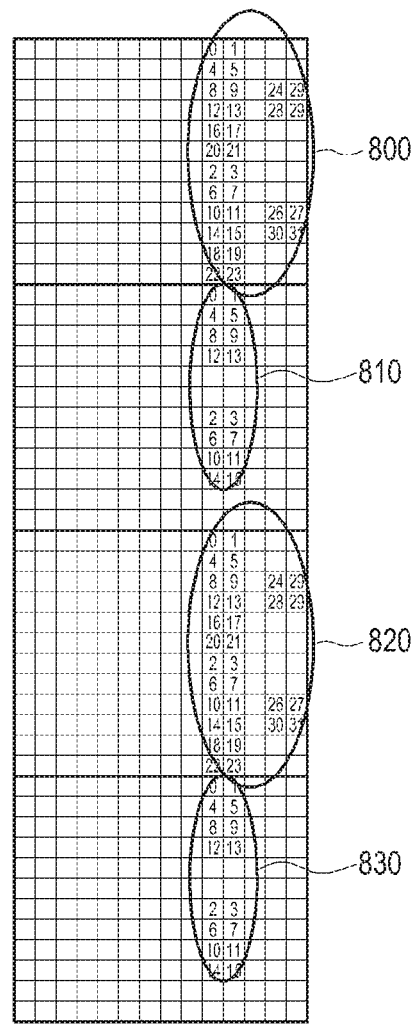
FIG. 8 illustrates a method for applying different CSI-RS mappings to the same subframe using the foregoing embodiments according to an embodiment of the present disclosure.

FIG. 8 illustrates a method for applying different CSI-RS mappings in the same subframe by applying the foregoing embodiments according to an embodiment of the present disclosure.

While different CSI-RS mapping schemes are applied to different subframes in FIG. 7, different CSI-RS mapping schemes may be applied in the same subframe in FIG. 8.

For example, CSI-RSs 800 and 820 may be horizontal CSI-RSs (H-CSI-RSs), and CSI-RSs 810 and 830 may be vertical CSI-RSs (V-CSI-RSs). The H-CSI-RSs are mapped with an RB spacing of 2 and an RB offset of 0, and the V-CSI-RSs are mapped with an RB spacing of 2 and an RB offset of 1. The transmitter may transmit the H-CSI-RSs and the V-RSI-CSs in the same subframe by generating a channel using a Kronecker product. In another example, the CSI-RSs 800 and 820 may be CSI-RSs of a first BS, and the CSI-RSs 810 and 830 may be CSI-RSs of a second BS. That is, different BSs may map CSI-RSs to RBs in the same subframe and transmit the CSI-RSs.

The foregoing embodiments may be applied in the same manner to channel state information interference measurements (CSI-IMs) as well as CSI-RSs.

3GPP Release 12 regulates that one transmitter may map up to 8 CSI-RSs and up to 4 CSI-IMs to an RB. To reduce system overhead or to increase the number of CSI-IMs without increasing system overhead, the above embodiments may also be applied to CSI-IMs.

The following description is given of an example of related parameters that may be reflected in a CSI-IM configuration.

Specifically, [Table 8] illustrates an example of combining an RB spacing and an RB offset into one value $D_{CSI-IM}$, and the results of combining RB spacings and RB offsets are same as listed in [Table 1].

TABLE 8

| RB spacing and RB offset in combination (CSI-RS-RBSpacingConfig) ($D_{CSI-IM}$) | RB spacing ($F_{CSI-IM}$, RBs) | RB offset (CSI-IM RB offset) ($\Delta_{F,CSI-IM}$) |
| --- | --- | --- |
| 0 | 1 | — |
| 1-2 | 2 | $D_{CSI-IM}$-1 |
| 3-5 | 3 | $D_{CSI-IM}$-3 |
| 6-9 | 4 | $D_{CSI-IM}$-6 |
| 10-14 | 5 | $D_{CSI-IM}$-10 |
| 15-20 | 6 | $D_{CSI-IM}$-15 |

[Table 9] illustrates an exemplary structure of a message that the transmitter transmits to the receiver, when a method for mapping CSI-RSs to RBs with an RB spacing to CSI-IMs.

TABLE 9

```
CSI-IM-Config ::= SEQUENCE {
    csi-IM-ConfigId      CSI-IM-ConfigId,
    resourceConfig       INTEGER (0. .31),
    subframeConfig       INTEGER (0. .154),
    D-CSI-IM             INTEGER (0. .20),
}
```

Compared to [Table 2], it may be noted from [Table 9] that D-CSI-IM is a result of combining an RB spacing and an RB offset, instead of D-CSI-RS.

Figure 9:
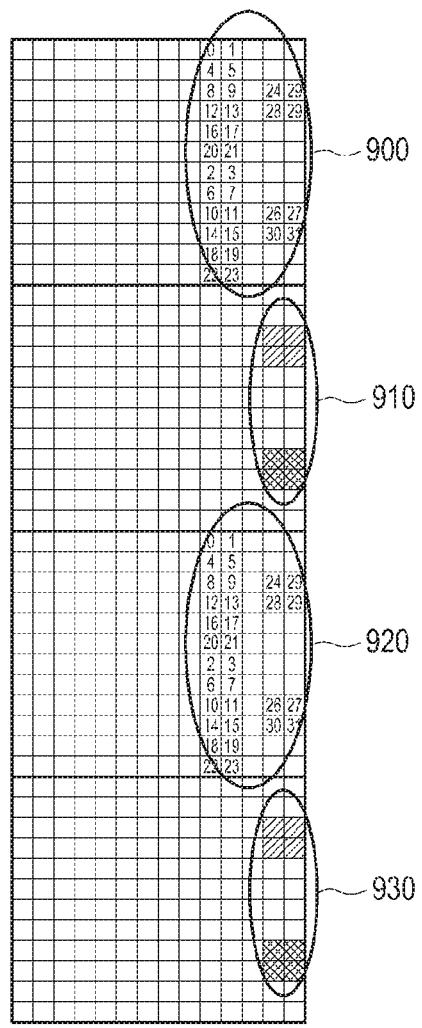
FIG. 9 illustrates a method for applying the foregoing embodiment to mapping of CSI-RSs and CSI interference measurements (CSI-IMs) to RBs according to an embodiment of the present disclosure.

FIG. 9 illustrates a method for applying the foregoing embodiments to mapping of CSI-RSs and CSI-IMs to RBs in the same subframe according to an embodiment of the present disclosure.

For example, RE groups 900 and 920 may carry CSI-RSs, and other RE groups 910 and 930 may carry CSI-IMs. The CSI-RSs may be mapped to the RBs with an RB spacing of 2 and an RB offset of 0, and the CSI-IMs may be mapped to the RBs with an RB spacing of 2 and an RB offset of 1.

Figure 10:
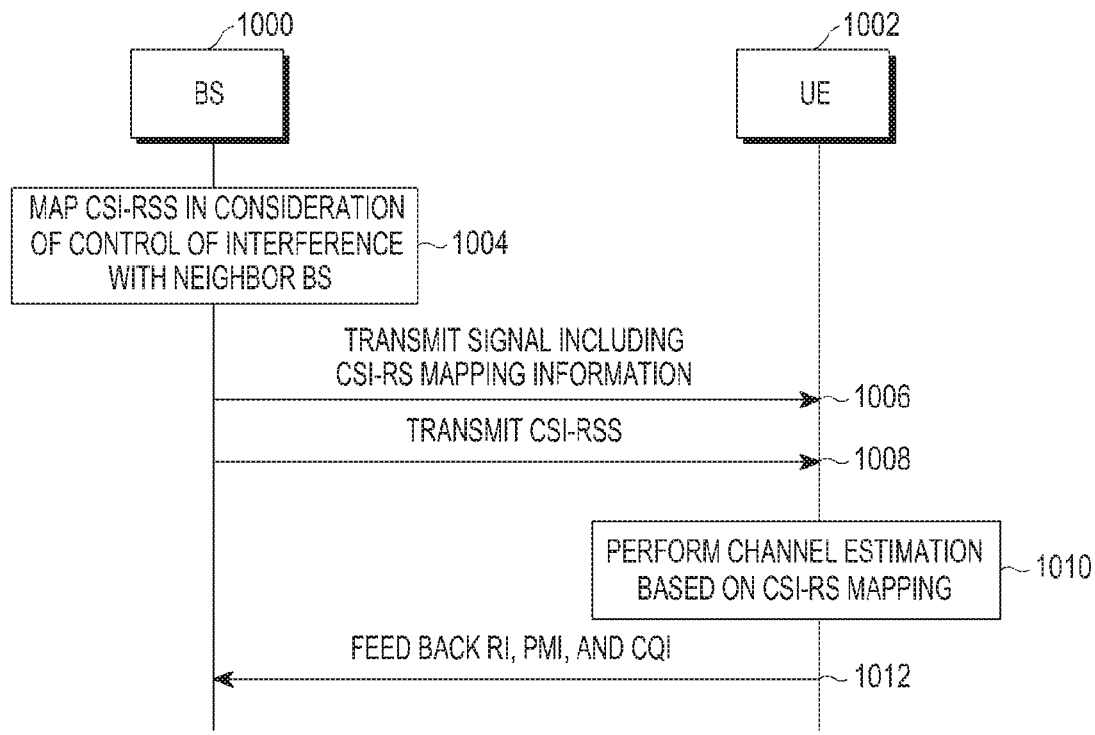
FIG. 10 is a diagram illustrating a signal flow of a transmitter, when the embodiments of the present disclosure are applied.

FIG. 10 is a diagram illustrating a signal flow between a BS and a UE, when embodiments of the present disclosure are applied.

A BS 1000 maps CSI-RSs to RBs in consideration of control of interference with a neighbor BS in operation 1004. That is, the BS 1000 maps the CSI-RSs to the RBs at positions other than the positions of RBs to which CSI-RSs of the neighbor BS are mapped. Further, various RB mapping methods of the present disclosure may be applied.

The BS 1000 transmits a signal including CSI-RS mapping information to a UE 1002 in operation 1006.

The BS 1000 transmits the CSI-RSs mapped to the RBs to the UE 1002 in operation 1008.

The UE 1002 performs channel estimation based on the mapped CSI-RSs in operation 1010.

The UE 1002 feeds back at least one of a rank indication (RI), a precoder matrix indication (PMI), and a channel quality indication (CQI) to the BS 1000 based on the channel estimation in operation 1012.

Figure 11:
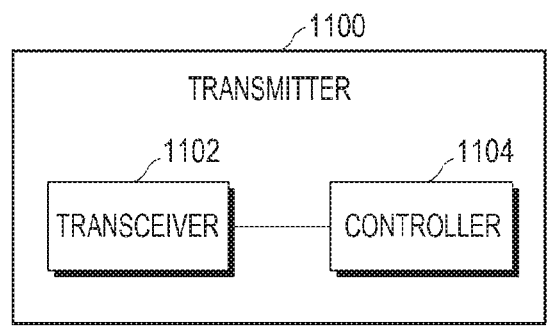
FIG. 11 is an exemplary block diagram of a transmitter according to the present disclosure.

FIG. 11 is a block diagram of a transmitter according to the present disclosure.

A transmitter 1100 according to the present disclosure is an apparatus that maps CSI-RSs to RBs and transmits the CSI-RSs, and performs the methods (or operations) of a transmitter described in the present disclosure. For example, the transmitter 1100 may be a BS, an eNB, or the like in a cellular system.

The transmitter 1100 may include a transceiver 1102 for transmitting and receiving signals to and from a receiver, and a controller 1104 for controlling the transceiver 1102.

The controller 1104 may be understood as performing all operations according to an embodiment for a transmitter according to the present disclosure.

While the transceiver 1102 and the controller 1104 are shown as separate components in FIG. 11, the transceiver 1102 and the controller 1104 may be incorporated into a single component.

Figure 12:
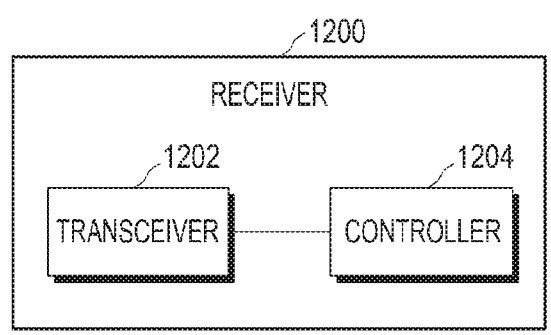
FIG. 12 is an exemplary block diagram of a receiver according to the present disclosure.

FIG. 12 is a block diagram of a receiver according to the present disclosure.

A receiver 1200 according to the present disclosure is an apparatus that receives CSI-RSs mapped to RBs, and performs the methods (or operations) of a receiver described in the present disclosure. For example, the receiver 1200 may be a UE or the like in a cellular system.

The receiver 1200 may include a transceiver 1202 for transmitting and receiving signals to and from a transmitter, and a controller 1204 for controlling the transceiver 1202.

The controller 1204 may be understood as performing all operations according to an embodiment for a receiver according to the present disclosure.

For example, when receiving RSs in an embodiment using an RB spacing, the controller 1204 may receive a message indicating a spacing between two RBs to which RSs are mapped and an RB offset indicating the positions of the RBs to which RSs are mapped. The controller 1204 may receive the RSs using the spacing and RB offset indicated by the message, and perform channel estimation using the received RSs. Herein, the controller 1204 may receive the RSs in transmission resources configured to include at least one RB without RSs between the two RBs to which RSs are mapped. The controller 1204 may feed back the result of the channel estimation to the transmitter.

For example, if receiving RSs in an embodiment using RB bundling, the controller 1204 may receive a message indicating the maximum number of antenna ports used for RS transmission. The controller 1204 may receive the RSs based on the maximum number of antenna ports indicted by the message and perform channel estimation using the received RSs. Herein, the controller 1204 may receive the RSs in transmission resources mapped to at least two contiguous RBs to which at least two different RS subsets of the RSs are mapped in a subframe. The controller 1204 may feed back the result of the channel estimation to the transmitter.

While the transceiver 1202 and the controller 1204 are shown as separate components in FIG. 12, the transceiver 1202 and the controller 1204 may be incorporated into a single component.

The above-described operations may be implemented by providing a memory storing a related program code in a component of a transmitter (BS) or a receiver (UE) in a communication system. That is, a controller of the transmitter or the receiver may perform the above-described operations by reading and executing the program code stored in the memory by means of a processor or a central processing unit (CPU).

Various components and modules of a transmitter or a receiver as described in the present disclosure may operate in hardware circuits such as complementary metal oxide semiconductor (CMOS)-based logic circuits, firmware, software, and/or a combination of hardware and firmware and/or software inserted into a machine-readable medium. For example, various electrical structures and methods may be implemented by use of electrical circuits such as transistors, logic gates and application-specific integrated circuits (ASICs).

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for transmitting a channel state information reference signal (CSI-RS) in a wireless communication system, the method comprising:
   transmitting information on CSI-RS resource mapping, the information on the CSI-RS resource mapping including information related to at least one resource block (RB) to which a CSI-RS is not mapped, wherein the at least one RB is located between two RBs to which the CSI-RS is mapped respectively, and wherein the at least one RB is located between the two RBs in a frequency domain; and
   transmitting the CSI-RS based on the information on CSI-RS resource mapping.

2. The method of claim 1, wherein the information on the CSI-RS resource mapping includes information on one or more resource elements (REs) per an RB, each of the one or more REs mapped to a CSI-RS port.

3. The method of claim 1, wherein the information on CSI-RS resource mapping includes information indicating an RB offset, and
   wherein the RB offset indicates which RBs are occupied by the CSI-RS.

4. The method of claim 3, wherein the RB offset indicates positions of the two RBs to which the CSI-RS is mapped.

5. The method of claim 1, wherein the information on CSI-RS resource mapping includes information of zero powered CSI-RS (ZP-CSI-RS) resources.

6. A method for receiving a channel state information reference signal (CSI-RS) in a wireless communication system, the method comprising:
   receiving information on CSI-RS resource mapping, the information on the CSI-RS resource mapping including information related to at least one resource block (RB) to which a CSI-RS is not mapped, wherein the at least one RB is located between two RBs to which the CSI-RS is mapped respectively, and wherein the at least one RB is located between the two RBs in a frequency domain; and
   receiving the CSI-RS based on the information on CSI-RS resource mapping.

7. The method of claim 6, wherein the information on the CSI-RS resource mapping includes information on one or more resource elements (REs) per an RB, each of the one or more REs mapped to a CSI-RS port.

8. The method of claim 6, wherein the information on CSI-RS resource mapping includes information indicating an RB offset, and
   wherein the RB offset indicates which RBs are occupied by the CSI-RS.

9. The method of claim 8, wherein the RB offset indicates positions of the two RBs to which the CSI-RS is mapped.

10. The method of claim 6, wherein the information on CSI-RS resource mapping includes information of zero powered CSI-RS (ZP-CSI-RS) resources.

11. An apparatus for transmitting a channel state information reference signal (CSI-RS) in a wireless communication system, the apparatus comprising:
    a transceiver configured to:
        transmit information on CSI-RS resource mapping, the information on the CSI-RS resource mapping including information related to at least one resource block (RB) to which a CSI-RS is not mapped, wherein the at least one RB is located between two RBs to which the CSI-RS is mapped respectively, and wherein the at least one RB is located between the two RBs in a frequency domain; and
        transmit the CSI-RS based on the information on CSI-RS resource mapping.

12. The apparatus of claim 11, wherein the information on the CSI-RS resource mapping includes information on one or more resource elements (REs) per an RB, each of the one or more REs mapped to a CSI-RS port.

13. The apparatus of claim 11, wherein the information on CSI-RS resource mapping includes information indicating an RB offset, and
    wherein the RB offset indicates which RBs are occupied by the CSI-RS.

14. The apparatus of claim 13, wherein the RB offset indicates positions of the two RBs to which the CSI-RS is mapped.

15. The apparatus of claim 11, wherein the information on CSI-RS resource mapping includes information of zero powered CSI-RS (ZP-CSI-RS) resources.

16. An apparatus for receiving a channel state information reference signal (CSI-RS) in a wireless communication system, the apparatus comprising:
    a transceiver configured to:
        receive information on CSI-RS resource mapping, the information on the CSI-RS resource mapping including information related to at least one resource block (RB) to which a CSI-RS is not mapped, wherein the at least one RB is located between two RBs to which the CSI-RS is mapped respectively, and wherein the at least one RB is located between the two RBs in a frequency domain; and
        receive the CSI-RS based on the information on CSI-RS resource mapping.

17. The apparatus of claim 16, wherein the information on the CSI-RS resource mapping includes information on one or more resource elements (REs) per an RB, each of the one or more REs mapped to a CSI-RS port.

18. The apparatus of claim 16, wherein the information on CSI-RS resource mapping includes information indicating an RB offset, and
    wherein the RB offset indicates which RBs are occupied by the CSI-RS.

19. The apparatus of claim 18, wherein the RB offset indicates positions of the two RBs to which the CSI-RS is mapped.

20. The apparatus of claim 16, wherein the information on CSI-RS resource mapping includes information of zero powered CSI-RS (ZP-CSI-RS) resources.

* * * * *